United States Patent

[11] 3,597,871

| [72] | Inventor | Ralph H. Hansen |
| | | 7230 Harrison St., Hammond, Ind. 46324 |
| [21] | Appl. No. | 7,558 |
| [22] | Filed | Feb. 2, 1970 |
| [45] | Patented | Aug. 10, 1971 |

[54] FISHING FLOAT DEVICE
10 Claims, 2 Drawing Figs.
[52] U.S. Cl. .................................................. 43/43.14
[51] Int. Cl. ................................................. A01k 93/00
[50] Field of Search ........................................ 43/42.22, 43.14

[56] References Cited
FOREIGN PATENTS
4,208  2/1898  Great Britain ............... 43/43.14

*Primary Examiner*—Melvin D. Rein
*Attorney*—Walter Leuca

ABSTRACT: This invention is a water fishing float or bobber device comprising an elongated rod member formed with a cylinder chamber having a piston reciprocable therein. A resiliently elastic sleeve member covers the elongated rod member and is connected thereto at the ends thereof. The piston is manually operated to pump air into the elastic sleeve member which inflates to a certain volume. This invention serves as a fishing float or the like which can be inflated to any select volume to replace the use of a plurality of different fixed volume floats.

Patented Aug. 10, 1971

3,597,871

INVENTOR.
RALPH H. HANSEN
BY Walter Leuca
ATTORNEY

3,597,871

FISHING FLOAT DEVICE

BACKGROUND OF THE INVENTION

This invention relates to water float devices and more particularly to a fishing float which is inflatable for a select displacement of water.

The prior art that I am aware of provides different-size fishing floats or bobbers each one of which are generally used for a specific purpose. In other words, when fishing for a certain type of fish which is characterized by type and size, an optimum-size float or bobber is utilized in order to indicate that such fish has been hooked. Accordingly, certain-size bobbers or floats, together with certain type of bait are used when fishing for different-type fish. The problem of the prior art that my invention is directed to is the problem of having available a series of different-size bobbers.

SUMMARY OF INVENTION

To overcome the above problem I provide an inflatable float which may be inflated to any select volume and thereby provide one device which may take the place of several floats of fixed sizes.

Accordingly, a principle object of my invention is to provide a float device which is manually inflatable by a plunger or piston member to select volume.

Another object of my invention is to provide an inflatable float which is easy to operate and economical to manufacture.

Other objects and advantages of my invention will become apparent after a careful study of the following detailed description when taken together with the accompanying drawing which illustrates a preferred embodiment thereof.

DESCRIPTION OF THE PREFERRED EMBODIMENT

Figure 1:
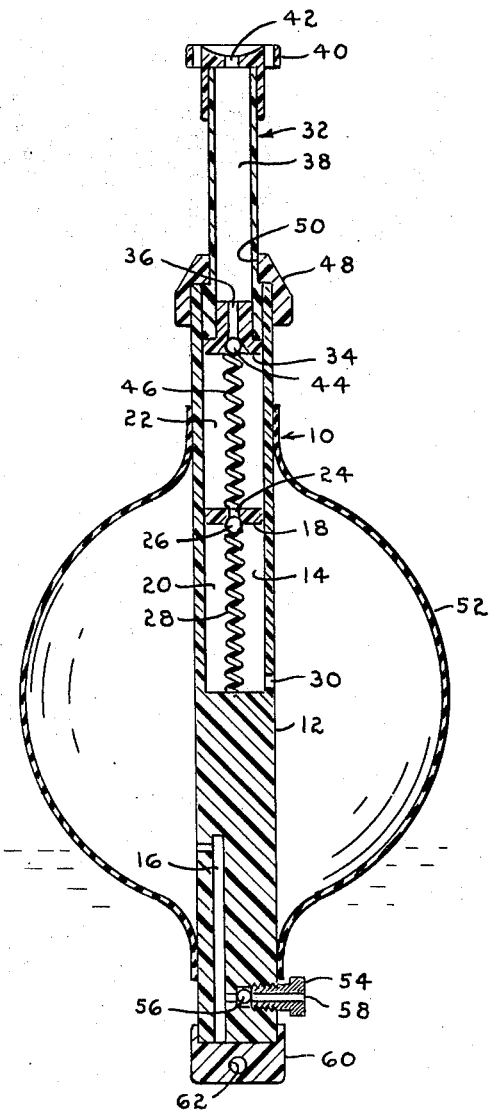
FIG. 1 is a longitudinally sectioned elevation of the float device of my invention in an inflated condition.

With reference now to the drawing, reference numeral 10 designates my invention generally. It comprises a rod or elongated tubular member 12 which is provided with a hollow 14 longitudinally therein from one end thereof. The remaining length of the rod is solid with the exception of a narrow release or vent passageway 16, for providing an uprighting counterbalance. A divider 18 is fixed in hollow 14 of rod 12 to form an interior chamber 20 and a cylindrical chamber 22. Divider 18 is provided with a beveled hole 24 therethrough in which is seated a ball valve 26 held in place therein by spring member 28. Hole 30 is provided in rod 12 to communicate chamber 20 with the exterior thereof. Chamber 22 is slidably fitted with a tubular plunger 32 which is provided with a plug 34 in the end thereof for serving as a piston. Piston plug 34 is formed with a beveled hole 36 therethrough to communicate chamber 22 with the tubular interior 38 of plunger 32. The exterior end of plunger 32 is fitted with a cap 40 which contains an aperture 42 therethrough which communicates the interior 38 of plunger 32 with atmosphere and allows for inspiration of air therethrough. Hole 36 in piston plug 34 is seated with a ball valve 44 in the level thereof. Spring member 46 maintains plunger 32 in its raised position as well as biases ball valve 44 against its beveled seat to close hole 36. I show the outside diameter of the piston end of plunger 32 as being formed larger in diameter than the body thereof so that seal bushing 48, which is fitted on the open end of rod 12 and formed with a reduced hole 50 through which tubular body of plunger 32 slidably moves, also serves as a stop for the diametrally larger piston end of plunger 32 thereby preventing plunger 32 from being removed or separated from rod 12.

An elastic sleeve member 52 formed from a stretchable material such as rubber tubularly formed covers rod 12 and is connected thereto only at the ends thereof with a sealtight connection adjacent each end of rod 12 so as to overlap hole 30 and one end of passageway 16 therein. Passageway 16 communicates the interior of elastic sleeve 52 and the exterior thereof at the other end of passageway 16. A screwplug 54 is threaded in the other end of passageway 16 and serves to seat a ball valve 56 against passageway 16. Release of screwplug 54 unseats ball valve 56 from end of passageway 16 thereby opening passageway 16 to communicate the interior of elastic sleeve member 52 with the atmosphere through hole 58 in screwplug 54.

It is to be understood of course that passageway 16 may take any direction through rod 12 to communicate the interior of elastic sleeve member 52 with the atmosphere. The direction of relief passageway 16 is illustrated in the drawing as longitudinal through rod 12 from the solid end thereof and holes are drilled through rod 12 from the side thereof inwardly until intersection is made with the longitudinal hole. The purpose of forming the holes as illustrated, obviously, is the result of manufacturing expedience. Consequently, cap element 60 is fitted on the solid end of rod 12 to cap the extended portion of passageway 16. I provide a hole 62 through cap 60 through which the fishing line (not shown) is strung or connected to the fishline float 10 of my invention. It is obvious that the capped end of passageway 16 can, if desired, be fitted with valved plug 54. In that event there would be no need for cap element 60, and hole 62 by which means the fishline float 10 of my invention is connected to the fishline and may be provided in the end of rod 12.

Figure 2:
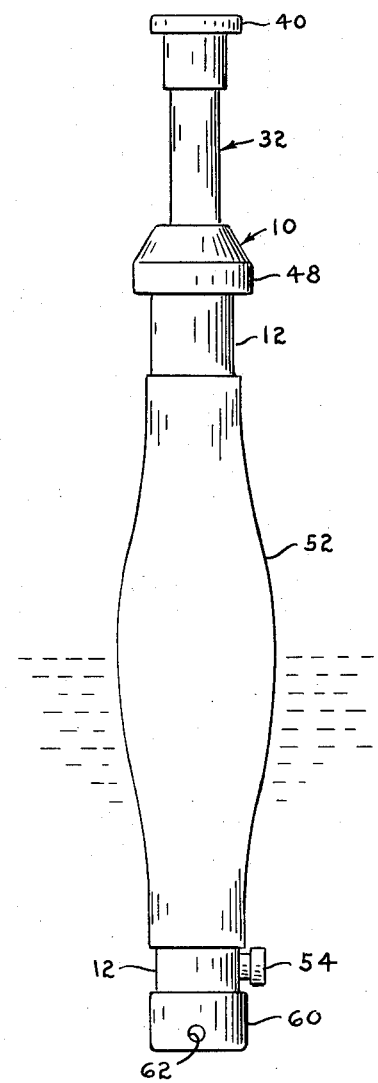
FIG. 2 is a side elevation of my invention in a deflated condition.

The fishline float 10 of my invention as shown in FIG. 2 is in a minimum inflated condition. In such minimum inflated condition, the fishline float will displace a small amount of water and the force required to pull the float under water will be small and will be used when fishing for a species of fish which because of its size or characteristic bait-seizing manner will exert a force sufficient to bob the float. By manually reciprocating plunger 32 in chamber 22 of rod 12, the air in chamber 22 (supplied thereto through aperture 42, tubular interior 38 and hole 36) is forced through hole 24 in divider 18 by unseating ball valve 26 against the bias of spring 28 and enters chamber 20 and therefrom through hole 30 enters the space between elastic sleeve 52 and rod 12. As more air is pumped into this space, elastic sleeve 52 enlarges balloon fashion to displace additional water, the weight of which is the magnitude of the force acting on the bobber 10 of my invention to float it.

Such increase volume as illustrated in FIG. 1 will be used when fishing for species of fish which are substantially larger and are capable of exerting sufficient force on the bait to submerge the float thereby indicating a catch of the desired fish. In order to release the air compressed within the elastic sleeve 52, the air is vented through passageway 16 by manually loosening screwplug 54 as above described and allowing the air to vent through passageway 16 and hole 58 in screwplug 54.

In the operation of my invention, the fishline is connected to hole 62 at the end of which is connected the baited fishhook. When the fishing line together with the float 10 of my invention is placed in water in the deflated condition as shown in FIG. 2, it will serve as a bobber for smaller fish since less force is required to bob the float upon a strike. When it is desired to employ the float 10 of my invention as a float of a different size, plunger 32 is manually reciprocated to pump air into the interior of elastic sleeve 52 inflating it to any volume desired to cause the float to displace more water. The increase in volume of the inflatable sleeve 52 and the corresponding increase in displacement of water will increase the force required to bob or submerge the float 10 of my invention.

It is obvious from the above description that the float 10 of my invention is a volumetrically adjustable float in that the elastic sleeve 52 may be manually inflated to different select sizes and therefore the float of my invention may replace a plurality of different-size floats.

I claim:
1. A fishing float device comprising:
a elongated member;
a flexible sleeve member covering said elongated member;
the ends of said flexible sleeve member connected to said elongated member adjacent the ends thereof,
said connection being an airtight connection;
said flexible sleeve member intermediate the ends thereof being laterally extendible from said elongated member to provide a space therearound;
one end of said elongated member having a cylindrical chamber;
said elongated member having hole means therein communicating said chamber and said space provided by said extendible sleeve member; and
a piston reciprocable in said chamber for forcing air from said chamber into said space provided by said extendible sleeve member through said hole means in said elongated member, and means for attaching a fishline to the lower end of said elongated member.

2. A fishing float device comprising:
an elongated member;
an elastic sleeve member covering said elongated member;
the ends of said elastic sleeve member connected to said elongated member adjacent the ends thereof,
said connection being an airtight connection;
said sleeve member intermediate the ends thereof being laterally stretchable from said elongated member to provide a space therearound;
one end of said elongated member having a cylindrical chamber;
said elongated member having hole means communicating said chamber and said space provided by said stretchable sleeve member;
a piston reciprocable in said chamber for forcing air from said chamber into said space provided by said stretchable sleeve member through said hole means in said elongated member; and
the other end of said elongated member provided with a vent means therethrough communicating said space provided by said stretchable sleeve member and the exterior of said sleeve member, and means for attaching a fishline to the lower end of said elongated member.

3. The fishing float device of claim 2 wherein said elongated member is further characterized as being a rigid tubular piece.

4. The fishing float device of claim 2 wherein said hole means is further characterized as valved and actuable by said piston to open and close said hole means.

5. The fishing float device of claim 2 wherein said vent means is further characterized as valved and actuable by hand.

6. The fishing float device of claim 4 wherein said vent means is further characterized as valved and actuable by hand.

7. The fishing float of claim 2 wherein the means for attaching the fishline comprises an apertured portion of the elongate member.

8. A fishing float comprising:
a tubular member having one end thereof fitted with a reciprocable piston therein and the other and thereof being closed;
an elastic tube member enveloping said tubular member,
said elastic tube member connecting said tubular member adjacent the open end thereof,
said connection being an airtight connection;
said elastic tube member other than said connected end thereof being laterally stretchable from said tubular member to provide a space therearound;
a passageway in said tubular member communicating the interior of said tubular member with the exterior thereof within said space provided by said elastic tube member; and
manually operable valve means for venting said space between said tubular member and said elastic tube member to atmosphere, and means for attaching a fishline to the lower end of said elongated member.

9. The fishing float of claim 8 wherein the means for attaching the fishline comprises an apertured downwardly extending portion of the tubular member.

10. The fishing float of claim 8 wherein said passageway in said tubular member is further characterized as being valved actuable to open and close said passageway by said reciprocable piston.